(12) United States Patent
Qiu et al.

(10) Patent No.: US 6,442,463 B1
(45) Date of Patent: Aug. 27, 2002

(54) FUZZY STEERING CONTROLLER

(75) Inventors: Hongchu Qiu, Fayetteville, PA (US); Qin Zhang; John F. Reid, both of Champaign, IL (US)

(73) Assignee: The Board Of Trustees Of The University Of Illinois, Urbana, IL (US)

( * ) Notice: Subject to any disclaimer, the term of this patent is extended or adjusted under 35 U.S.C. 154(b) by 0 days.

(21) Appl. No.: 09/781,019

(22) Filed: Feb. 9, 2001

(51) Int. Cl.⁷ .............................................. G06F 19/00
(52) U.S. Cl. ........................... 701/44; 701/41; 180/408; 180/415; 706/905
(58) Field of Search ............................. 701/44, 41, 42; 180/422, 421, 446, 408, 415; 706/900, 905

(56) References Cited

U.S. PATENT DOCUMENTS

| | | | |
|---|---|---|---|
| 5,487,007 A | * | 1/1996 | Suzuki et al. ............... 180/422 |
| 5,545,960 A | | 8/1996 | Ishikawa ..................... 318/587 |
| 5,634,698 A | | 6/1997 | Cao et al. .................... 303/146 |
| 5,717,606 A | * | 2/1998 | Hara et al. .................. 180/272 |

* cited by examiner

*Primary Examiner*—Tan Nguyen
(74) *Attorney, Agent, or Firm*—Nilles & Nilles, S.C.

(57) ABSTRACT

A fuzzy steering controller for wheel-type agricultural vehicles with an electrohydraulic steering system is disclosed. The fuzzy controller was developed based on a common-sense model of agricultural vehicle steering. The controller implements steering corrections based upon the desired steering rate and the error between the desired and the actual wheel angles. The controller consists of a variable fuzzifier, an inference engine with a steering control rulebase, and a control signal defuzzifier. The controller could be used on different platforms. Tuning of the fuzzy membership functions will accommodate for physical differences between the platforms. The controller achieves prompt and accurate steering control performance on both a hardware-in-the-loop electrohydraulic steering simulator and on an agricultural tractor.

20 Claims, 7 Drawing Sheets

| STEERING ACTIONS | LEVELS OF STEERING ERROR | | | | | | |
|---|---|---|---|---|---|---|---|
| | NL | NM | NS | ZE | PS | PM | PL |
| NL | NL | NM | 0.2*NS | PS | PL | PL | PL |
| NM | NL | NM | 0.3*NS | PS | PL | PL | PL |
| NS | NL | NM | 0.4*NS | ZE | PM | PM | PL |
| ZE | NL | NM | NS | ZE | PS | PM | PL |
| PS | NL | NL | NL | ZE | 0.4*PS | PM | PL |
| PM | NL | NL | NL | NS | 0.3*PS | PM | PL |
| PL | NL | NL | NL | NS | 0.2*PS | PM | PL |

(Left axis label: LEVELS OF STEERING RATE)

*FIG. 2*

FUZZY STEERING CONTROLLER

FIELD OF THE INVENTION

The invention relates to control systems for electrohydraulic steering controllers for work vehicles, such as agricultural and construction vehicles. More particularly, it relates to such control systems having fuzzy logic control elements.

BACKGROUND OF THE INVENTION

Agricultural vehicles are designed to travel on fields performing desired agricultural operations. For safe and productive operations, one of the fundamental requirements for agricultural vehicles is high maneuverability. The adoption of electrohydraulic (E/H) steering on agricultural vehicles makes it possible to apply electronic control for better vehicle maneuverability. However, the highly nonlinear nature of the E/H system will affect the performance of the vehicle steering. Variations in field conditions make it more difficult to have high performance steering control. Conventional control technologies have limitations in solving such problems effectively (Qiu, et al. 1999; Wu, et al. 1998), yet a skillful operator adapts well to such changing conditions.

Fuzzy control is an advanced control technology that can mimic a human operator's operating strategy to control a complicated system (Pedrycz 1993), and can handle systems with uncertainty and nonlinearity (Yen, et al. 1994; Corbet, et al. 1996). Numerous fuzzy control applications on vehicles have been reported. Todo, et al. (1999) developed a fuzzy controller that utilized the offset and the orientation errors to control the steering of a mobile robot and resulted in satisfactory trajectory tracking performance. Zhang, et al. (1999) developed an adaptive fuzzy controller for a One Degree-of-Freedom (1-DOF) E/H actuator system. This fuzzy controller compensated for system non-linearities and provided accurate velocity control on the hydraulic actuator while subjected to changing load.

What is needed is a control system for an E/H steering system that compensates for these inherent non-linearities. This application presents the development and construction of a fuzzy steering controller for agricultural and construction vehicles with E/H steering systems that compensates for these non-linearities. The controller steers a vehicle to follow desired trajectories based upon the steering rate command and the error in steering angle.

SUMMARY OF THE INVENTION

In accordance with a first embodiment of the invention, a steering controller for a wheeled work vehicle is provided having a hydraulic actuator coupled to steerable wheels on the vehicle and driven by a proportional control electrohydraulic valve, a sensor that generates a signal indicative of the degree of turning of the wheels and the actual position of the wheels, the controller including a first fuzzifying circuit configured to convert a single real-valued turning rate signal into a first set of two values indicative of membership in two fuzzy sets, a second fuzzifying circuit configured to convert a single real-valued turning position signal into a second set of two values indicative of membership in two fuzzy sets, a fuzzy rule base including a plurality of rules to convert the first and second sets of values into a third set of values indicating membership in two or more fuzzy steering command sets, a fuzzy inference engine configured to apply the plurality of rules to the first and second sets and derive the third set of values; and a defuzzifying circuit configured to combine the third set of values into a single real-valued steering command indicative of the degree of opening of the proportional control electrohydraulic valve.

The first set may represent the degree of membership in two of at least five fuzzy domains, including one domain representative of a steering rate of zero. The first set may represent the degree of membership in two of at least seven fuzzy domains. The second set may represent the degree of membership in two of at least five fuzzy domains, including at least one domain representative of a steering error of zero degrees. The second set may represent the degree of membership in two of at least seven fuzzy domains. The third set may represent the degree of membership in two of at least five fuzzy domains, including at least one domain representative of a steering command indicative of zero flow through the valve. The third set may represent the degree of membership in two of at least seven fuzzy domains.

In accordance with a second embodiment of the invention a wheeled work vehicle is provided, including a chassis, a plurality of steerable wheels pivotally mounted on the chassis, at least one hydraulic actuator coupled to the plurality of steerable wheels and to the chassis to steer the wheels left and right with respect to the chassis, an electrohydraulic proportional control valve fluidly coupled to the at least one actuator to regulate the flow of hydraulic fluid to the actuator in proportion to a valve signal, a driver circuit configured to convert a steering command signal to the valve signal, a microprocessor coupled to the driver circuit and configured to calculate the steering command signal based at least upon a signal indicative of an error in wheel steering position and a signal indicative of a rate of change of wheel steering position, wherein the microprocessor is further configured to fuzzify the signal indicative of a rate of change of wheel turning, by converting it into a first set of two values indicative of membership in two fuzzy sets, fuzzify the signal indicative of an error in wheel steering position by converting it into a second set of two values indicative of membership in two fuzzy sets, convert the first and second sets into a third set of values indicating membership in two or more fuzzy steering command sets by a fuzzy logic inference engine using a fuzzy logic rule base, and defuzzify the third set of values into the steering command indicative of the degree of opening of the valve.

The vehicle may also include a position sensor coupled to move responsively with both the wheels and the actuator and to provide the signal indicative of such motion. The signal indicative of such motion may be directly representative of the actuator position. The signal indicative of an error in wheel steering position may be derived from the signal indicative of such motion. The vehicle may also include a trajectory-planning controller configured to compute a vehicular course of travel through the field and to derive the signal indicative of an error in wheel steering position and the signal indicative of wheel steering rate.

In accordance with a third embodiment of the invention, a method for controlling the steering of a vehicle having steerable wheels steered by a hydraulic actuator, wherein the actuator is controlled by a proportional control valve regulated by a signal indicative of a degree of valve opening, the vehicle further having a microprocessor-based controller configured to generate the signal thereby controlling the steering position of the wheels, is disclosed, the method including the steps of receiving a first real-valued signal indicative of an error in wheel steering position, converting the first real-valued signal into a first plurality of values indicative of membership in a corresponding first plurality of fuzzy steering error domains, receiving a second real-valued signal indicative of a rate of wheel steering, converting the second real-valued signal into a second plurality of values indicative of membership in a corresponding second plurality of fuzzy steering rate domains, combining the first and second plurality of values to generate a third plurality of values indicative of membership in at least two of five steering command domains using a plurality of fuzzy logic rules in a fuzzy logic rule base that are selected at least to reduce the steering error signal toward zero, converting the third plurality of values into a single real-valued steering command signal indicative of the degree of opening of the valve, converting the single real-valued steering command signal into a valve signal in a driver circuit, applying the valve signal to the valve, and responsively moving the actuator to a position in which the steering error is reduced.

The step of converting the first real valued signal may include the steps of comparing the first real-valued signal with at least five fuzzy steering error domains, determining the degree of membership in each of the at least five fuzzy steering error domains, and producing at least two values indicative of the degree of membership in at least two of the five fuzzy steering error domains. The step of converting the second real valued signal may include the steps of comparing the second real-valued signal with at least five fuzzy steering rate domains, determining the degree of membership of each of the at least five fuzzy steering rate domains, and producing at least two values indicative of the degree of membership in at least two of the five fuzzy steering rate domains. The rulebase may associate the at least five fuzzy steering error domains and the at least five fuzzy steering rate domains with at least five fuzzy logic steering command domains. The step of combining the first and second pluralities of values may include the steps of accessing the rulebase with the first and second pluralities of values, determining the degree of membership of each of the at least five fuzzy steering commands, and producing at least two steering command values indicative of the degree of membership in at least two of the five fuzzy logic steering command domains. One of the fuzzy logic steering rate domains may be centered on a steering rate of zero, one of the fuzzy logic steering domains may be centered on an error of zero, and wherein one of the fuzzy logic steering command domains is centered on a command signal providing an effective flow rate of zero through the valve. There may be at least seven fuzzy logic steering rate domains and three of those domains may symmetrically balanced with three other steering rate domains about a steering rate of zero. There may be at least seven fuzzy logic steering error domains and three of those domains may be symmetrically balanced with three other steering error domains about a steering error of zero. There may be at least seven fuzzy logic steering command domains and three of those domains may be symmetrically balanced with three other steering command domains about a steering command providing an effective flow rate of zero through the valve.

BRIEF DESCRIPTION OF THE DRAWINGS

The present invention will become more fully understood from the following detailed description, taken in conjunction with the accompanying drawings, wherein like reference numerals refer to like parts, in which:

FIG. 2 illustrates the fuzzy logic rulebase of the steering controller of FIG. 1;

DETAILED DESCRIPTION OF THE PREFERRED EMBODIMENTS

Figure 1:
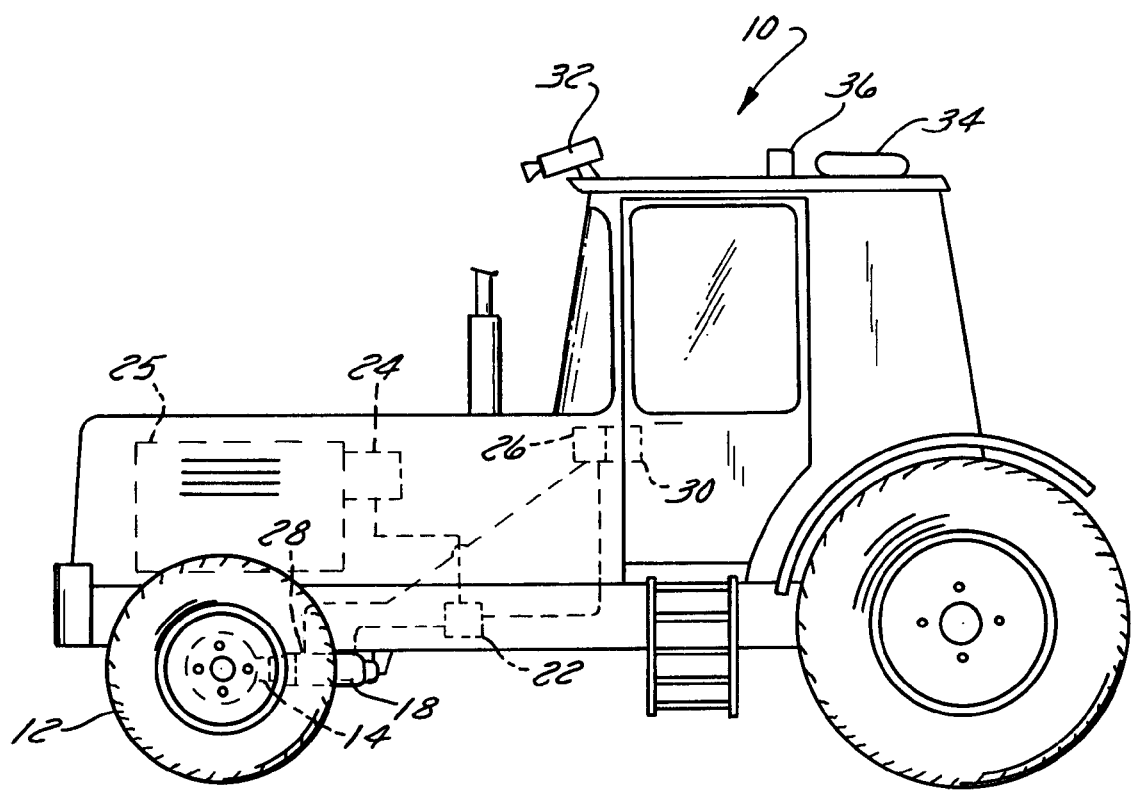
FIG. 1 illustrates a work vehicle (in this case an agricultural tractor) that is steered by a hydraulic actuator under the control of an electrohydraulic steering controller in accordance with the present invention in response to a steering signal provided by an optional trajectory-planning controller.

Referring now to FIG. 1, a tractor 10 has a pair of front wheels 12 that are rotationally coupled to front axles 14. Each wheel may be pivoted about a substantially vertical axis 16 to steer the tractor. A hydraulic actuator 18, here shown as a hydraulic cylinder, is coupled to the frame of the tractor and to the front wheels 12 to steer the front wheels left and right about axis 16. A hydraulic valve 22 is fluidly coupled between a hydraulic pump 24 (driven by vehicle engine 25) and cylinder 18 to fill and empty the cylinder, thereby changing the overall length of the cylinder and thereby steering the vehicle. An electronic steering controller 26 is coupled to valve 22. It sends electrical signals to valve 22 that cause the valve to open and close proportional to the magnitude of the signals. A position sensor 28 is coupled to the cylinder to provide a signal indicative of the position of the cylinder, and hence the steering angle of the front wheels. The sensor is also coupled to controller 26.

A trajectory controller 30 is also provided on tractor 10. The trajectory controller generates a signal indicative of the desired angle to which the front wheels should be turned. This desired steering angle or steering command is generated by controller 30 based upon signals received from CCD camera 32, a real-time kinematic differential global positioning system (RTK-DGPS) 34, and a fiber optic gyroscope (FOG) 36 to which controller 30 is coupled. Steering controller 26 receives the steering command and, using fuzzy logic control circuitry described below, responds to the steering command and steers the vehicle in the direction indicated by the steering command.

While a trajectory-planning controller is employed in the preferred embodiment, it may be entirely replaced with a more traditional input device, such as a steering wheel manipulated by the vehicle operator. A steering wheel using a potentiometer or shaft encoder will provide the same signal to the steering controller that the trajectory-planning controller does: a signal indicative of the desired turning angle. This may be provided as the Ackermann angle, for example.

Tractor 10 in the illustrated embodiment is a Case-IH MX 240 tractor. Valve 22 is preferably an Eaton four-port closed-center proportional directional control E/H valve. Steering controller 26 and trajectory controller 30 are preferably a PC-based controller that outputs voltage signals for valve control. A High Country Tek dual-coil PWM driver card is plugged into the PC-based steering controller to convert the voltage signals generated by the controller into PWM duty cycles at a higher current level. These PWM signals generated by the High Country driver card are then applied to the bi-directional Eaton valve (item 22) to open or close the valve.

Valve 22, in turn, regulates the hydraulic fluid flow rate to the steering cylinder 18 to control the turning of the front wheels.

Position sensor 28 is preferably a calibrated linear potentiometer attached to the hydraulic steering cylinder to indirectly measure the actual front wheel angle based on a steering linkage gain.

The trajectory controller is a portable IBM compatible computer. The steering controller is also a portable IBM-compatible computer coupled to a High Country Tek PWM driver card. The steering controller computer transmits a voltage signal to the High Country driver card that converts the variable voltage into a PWM signal. The PWM signal, in turn, is applied to the electrohydraulic valve of the vehicle. The vehicle is a Case-IH MX240 tractor.

Figure 3:
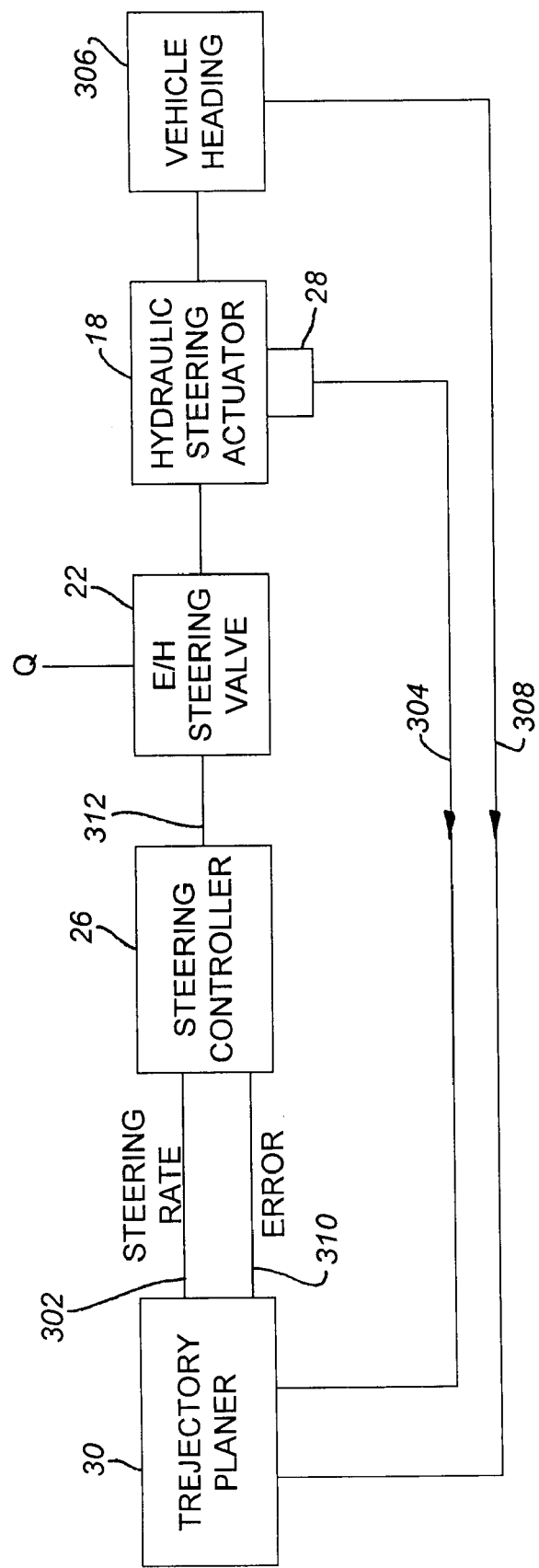
FIG. 3 is a block diagram of the steering controller showing the feedback paths.

FIG. 3 illustrates the control process in more detail. The trajectory controller 30 receives a cylinder position signal from position sensor 28. Based on the other sensors described in FIG. 1, it calculates a trajectory or path in the field and, based on this path, determines the angle that the vehicle should steer. Since it also receives the actual steering angle of the front wheels, it determines the difference between the actual wheel angle and the commanded wheel angle. This difference is called the steering error 310. As part of its calculations trajectory controller 30 also determines the rate 302 at which the wheels should be turned to the right or to the left. It provides both the steering rate 302 and the steering error 310 to the steering controller 26. The steering controller, in turn, determines the signal 312 that should be applied to the electrohydraulic steering valve 22 and applies it to the valve. Valve 22, which is connected to the hydraulic supply "Q" opens or closes the commanded amount, thereby regulating the flow of hydraulic fluid "q" to actuator 18. Flow "q" moves steering actuator 18. This movement is sensed by sensor 28 and is fed back to trajectory controller 30 for its next calculation.

Since the vehicle is moving through the field when the steering is changed, the vehicle itself turns (see block 306) and this change in vehicle orientation, sensed by GPS 34 asnd gyro 36 is fed back to the trajectory controller 30 as well. In this manner, the loop is closed.

The central control functions are performed by the steering controller 26 which includes a fuzzy logic control circuit implemented in its control program and described below in more detail.

FUZZY CONTROLLER DESIGN AND TUNING

Design of the Fuzzy Steering Controller

The fuzzy logic circuitry described below is preferably implemented by controlling the steering controller microprocessor with a control program stored in a ROM or RAM memory of the steering controller 26.

While the fuzzy logic circuitry (indeed, the steering controller itself) can be implemented in the form of discrete analog and digital components, such an implementation would make the system difficult to adjust, tune and upgrade as the algorithms are refined, and thus is not preferred.

The steering controller 30 uses (a) the desired steering rate and (b) the steering angle of the front wheels as inputs to determine how to control valve 22 and hence how the vehicle is steered. Since the flow rate to the cylinder 18 is roughly proportional to the steering rate, and since the flow rate of the valve is roughly proportional to the signal applied to the valve, a control circuit based on steering rate is relatively easy to implement.

Figure 4:
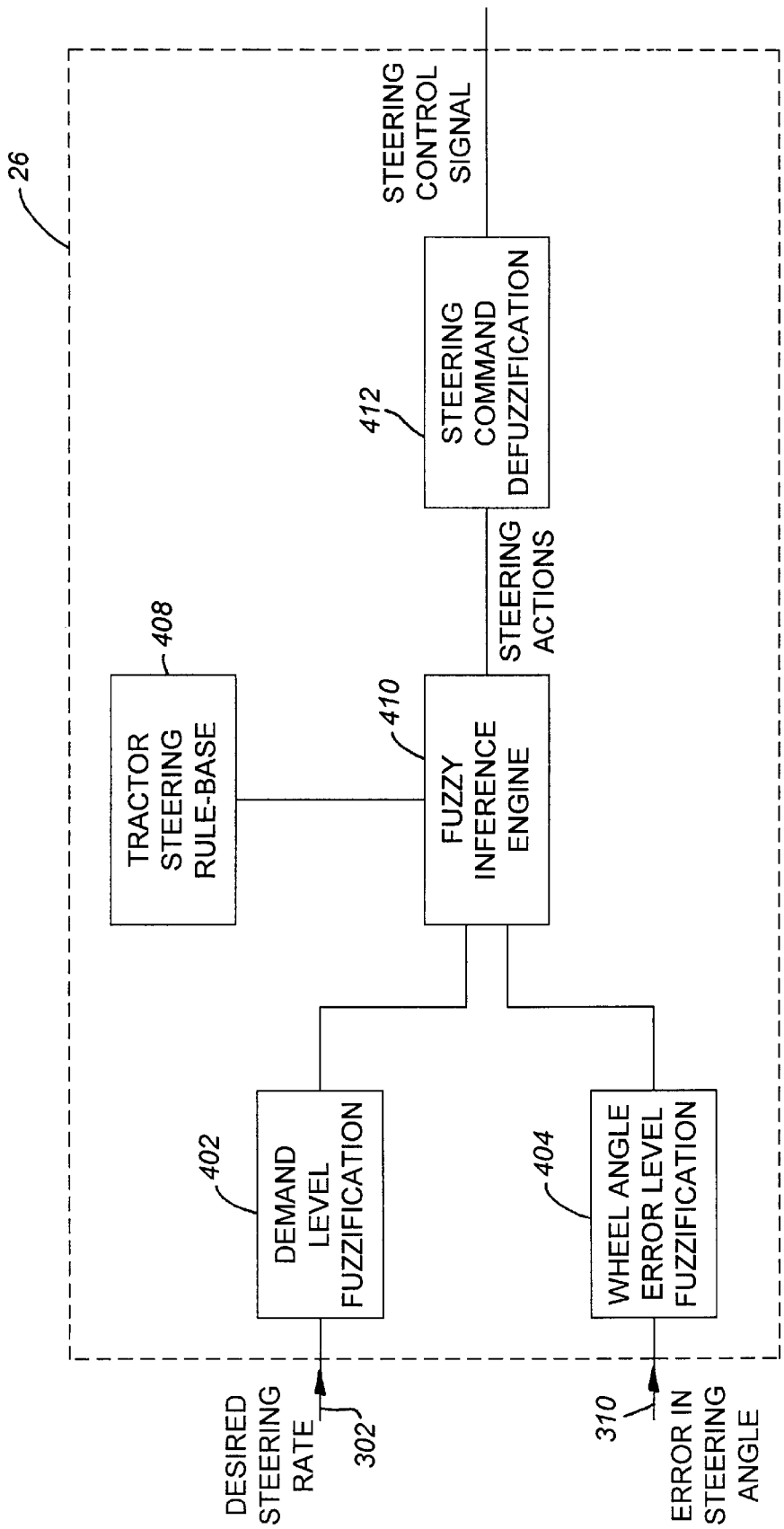
FIG. 4 is detailed block diagram of the input fuzzification, the inference engine, the fuzzy logic rulebase and the output de-fuzzification performed by the steering controller.

As best shown in FIG. 4, The fuzzy steering controller is configured to respond to two inputs, 302, 310 and to generate a single output signal. The output from the fuzzy controller is the crisp steering control signal (with a varying voltage) that drives the E/H steering control valve 22 after it is converted to a PWM signal by the High Country Tek PWM driver card.

FIG. 4 shows a block diagram of the fuzzy steering controller consisting of two input variable fuzzifiers 402, 404 for fuzzifying the two input signals, a steering rulebase 308, a fuzzy inference engine 310, and a steering command defuzzifier 312 that defuzzifies the output of the inference engine.

The two input fuzzifiers 402, 404 were designed to convert real-valued input variables into linguistic variables with appropriate fuzzy memberships. Each fuzzifier consists of a set of fuzzy membership functions defining the domain for each linguistic input variable. A real-valued input variable is normally converted into two linguistic values with associated memberships based on the defined domains of these linguistic values.

Figure 5:
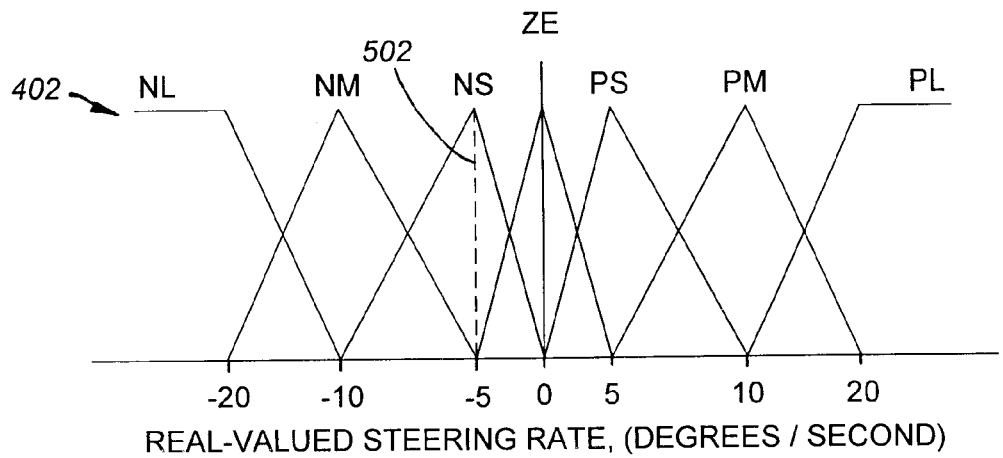
FIG. 5 shows the domains of the membership functions for the desired steering rate; the functions transform the one real-valued steering rate into two corresponding linguistic levels of demand steering rate based upon their defined domains.

The first input fuzzifier 402, as detailed in FIG. 5, converts the real-valued commanded steering rate signal input from the trajectory planning controller 30 into two fuzzy values. Seven fuzzy values of steering rates, including negative_large (NL), negative_medium (NM), negative_small (NS), zero (ZE), positive_small (PS), positive_medium (PM), and positive_large (PL), and associated fuzzy membership functions were defined for a steering rate between −20°/s and +20°/s.

The definitions of these fuzzy values play a critical role in the design of the fuzzy steering controller, and are commonly defined based upon the capacity and the nonlinear characteristics of the hydraulic steering system. The ZE fuzzy function represents a commanded steering rate of zero. The PS, PM and PL functions represent the rate at which the vehicle's wheels should be steered to the right. PS for small right turn rates, PM for medium right turn rates, and PL for large right turn rates.

Similarly, the NS, NM and NL functions represent the rate at which the vehicle's wheels should be steered to the left. NS for small left turn rates, NM for medium left turn rates, and NL for large left turn rates.

Figure 6:
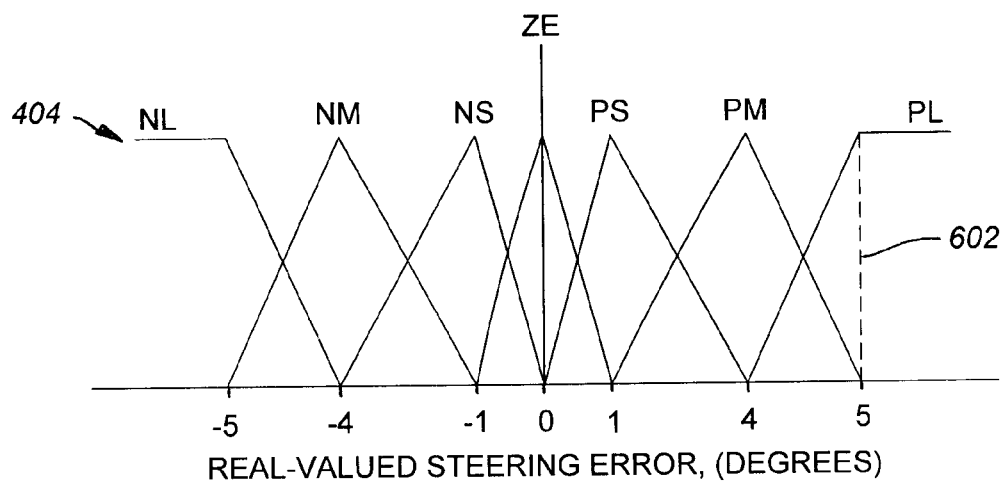
FIG. 6 shows the domains of fuzzy membership functions for the steering error signal; the functions transform the one real-valued steering error signal into tow corresponding linguistic levels of demand steering rate based upon their defined domains.

The second input fuzzifier 404, as detailed in FIG. 6, converts the real-valued steering error signal input from the trajectory planning controller 30 into two fuzzy values. Seven fuzzy values of steering errors, including negative_large (NL), negative_medium (NM), negative_small (NS), zero (ZE), positive_small (PS), positive_medium (PM), and positive_large (PL), and associated fuzzy membership functions were defined for a steering errors between −5 degrees and +5 degrees.

The ZE fuzzy function represents the degree to which the vehicle's wheels are pointed in exactly the direction the trajectory controller 30 wishes them to be pointed. In other words, if the trajectory controller 30 determines that the wheels are pointed in the proper direction to keep the vehicle on the proper trajectory or path through the field, it will generate a steering error signal of zero.

The PS, PM and PL functions represent the amount to which the vehicle's wheels too far to the right. PS when the wheels are only pointed a little too far to the right, PM when the wheels are pointed a too far to the right, and PL when the wheels are pointed way too far to the right.

Similarly, the NS, NM and NL functions represent the amount to which the vehicle's wheels too far to the left NS when the wheels are only pointed a little too far to the left, NM when the wheels are pointed a too far to the left, and NL when the wheels are pointed way too far to the left.

Fuzzy Inference Engine and Rule Base

The fuzzy inference engine 410 was designed to select appropriate steering action for specific steering conditions based upon (a) the desired steering rate provided by steering rate fizzifier 402, and (b) the error in front wheel angle that are provided by steering error fuzzifier 404.

The inference engine 410 selects the appropriate action from the steering control rules stored in rulebase 408 based upon the fuzzified values output from the input fuzzifiers.

Referring now to rulebase 408, shown in greater detail in FIG. 2, the following IF-THEN rule structure is the general format used for this steering controller:

IF desired steering rate is FUZ_RATE_LEVEL,
AND the steering error is FUZ_ERROR_LEVEL,
THEN the control signal should be at FUZ_OUTPUT_LEVEL The fuzzy relations included in the fuzzy control rules were empirically determined according to typical behaviors for maneuvering an agricultural vehicle. FIG. 2 summarizes the fuzzy relations for the control rules developed for the tractor steering control. The first column of FIG. 2 represents the desired steering rate. The first row of FIG. 2 represents the steering error. Each of the cells in the table of FIG. 2 contain the fuzzy steering commands corresponding to each level of the desired steering rate and the steering error as fuzzified in blocks 402 and 404.

In the typical case, the fuzzification steps will provide two linguistic values with their corresponding degrees of fuzzy membership. For example, the fuzzification step 402 might indicate 0.3 membership in ZE and 0.7 membership in NS. The fuzzification step 404 might provide 0.6 membership on PL and 0.4 membership in PM.

These four memberships, when applied to the rulebase of FIG. 2 select the intersection of a two-by-two block in the rulebase—the intersection of "ZE" and "NS" of the steering rate column with "PL" and "PM" of the steering error rows. The inference engine then converts this two-by-two block into a reduced set of memberships (the steering actions) using the center-of-area method.

The output from the fuzzy controller is one or more linguistic values and their associated memberships. These values are then defuzzified to create a single real-values output signal. The output signal is then converted from a voltage value (see FIG. 7) to a pulse-width modulated signal and is applied to the valve 22. The process of defuzzifying the steering actions is described in the next section.

As a final note, there are several values in the table of FIG. 2 that have additional scaling values, such as "0.2". These values compensate for vehicle over-steer in specific situations. From our experience in controller tuning, oversteering often occurred when the steering error was small. The larger the desired steering rate, the more the oversteering tended to be. Reducing the level of steering action solved the problem. This reduction in steering action is shown by the empirically determined scaling factors of 0.2 and 0.4 that are shown in the cells of the steering rulebase of FIG. 2.

Steering Action Defuzzification

Once the steering command fuzzy memberships have been determined, the system must defuzzify the memberships to provide a single real-valued steering command signal. The defuzzification process converts one or more fuzzy-valued outputs to one real-valued output. There are many defuzzification methods, such as center of gravity (COG), center-average, maximum criterion, mean of maximum, and center of area (COA), available for different applications (Passino and Yurkovich 1998).

Although any of these methods would be acceptable (with appropriate changes to the rulebase, of course), defuzzification block 412 (FIG. 4) of the steering controller implements the COA defuzzification method to determine the real-valued steering control signal.

By this approach, the real-valued steering control signal, u, was determined by the domain and the memberships of the selected fuzzy steering corrections, $\mu(u_i)$, using the following equation:

$$u = \frac{\sum_{i=1}^{n} u_i \mu(u_i) du}{\sum_{i=1}^{n} \mu(u_i) du}. \quad (1)$$

The COA method naturally averages the domains of selected fuzzy steering corrections, and thus reduces the sensitivity of the system to noise. The use of a COA approach increased the robustness and accuracy of the steering control.

Figure 7:
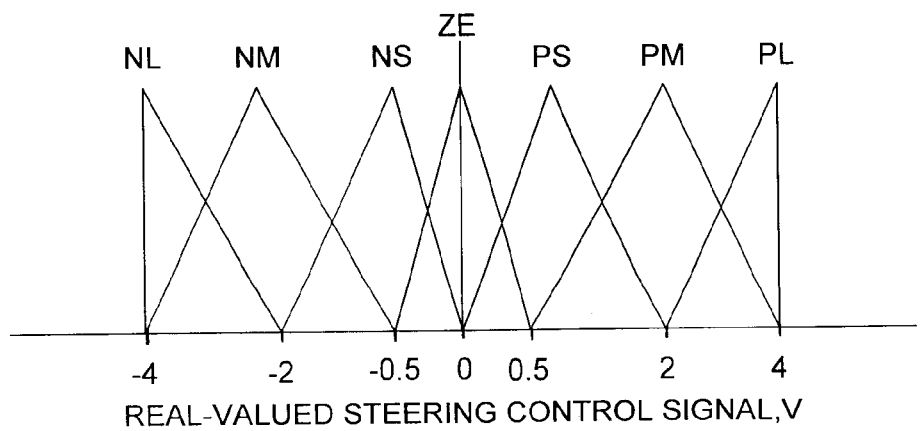
FIG. 7 shows the domains of fuzzy membership functions for levels of the steering control signal; the functions transform two or more fuzzy-valued steering level signals into one real-valued steering control signal.

The defuzzification membership function that turns the steering action into a single real-valued signal is shown in FIG. 7. There are seven domains that comprise the output membership function. The output value is a voltage that is subsequently converted into a PWM signal and applied to the valve. A zero voltage when converted into a PWM signal causes the valve to close entirely, preventing the actuator from moving. As the voltage goes more negative, the valve opens progressively wider and the PWM signal causes the actuator to move in a direction that steers the wheels at a progressively faster rate to the left. As the voltage goes more positive from zero, the valve opens progressively wider and the PWM signal causes the actuator to move in a direction that steers the wheels at a progressively faster rate to the right. Thus, the more positive the voltage signal is, the faster the wheels turn to the right and the more negative the voltage signal is the faster the wheels turn to the left.

Note that the specific voltage values are not symmetric. The extreme values are −3 and +4 volts respectively. While the values are not symmetric, the wheels response is symmetric. A value of −3 volts causes the wheels to turn or steer to the left at the same rate in degrees per second that a value of +4 volts cases the wheels to turn to the right The reason that values of each fuzzy logic domain are not symmetric yet the operation of the output function is symmetric is because of the geometry of the steering mechanism. Thus, the output function is indeed symmetric about a wheel turning rate of zero (i.e. a voltage of zero) if we substituted the actual turning or steering rates in place of the voltages values.

Tuning of the Fuzzy Steering Controller

As one might expect, the values of the fuzzy logic rules were not selected at random, but were created by tuning the fuzzy algorithm and testing it on a hardware-in-the-loop controller prior to using the steering controller in the field.

The performance of the fuzzy steering controller depends on the appropriation of domain definition for both input and output fuzzy variables. Properly defined fuzzy variables for a specific vehicle will improve the stability, accuracy, and nonlinearity compensation of the fuzzy steering controller. In this study, a triangular fuzzy membership function, $\mu_{FV}$, was defined by domain values of $a_i$, $a_j$ and $a_k$, for each fuzzy value (FV) in the fuzzy steering controller.

$$\mu_A = \begin{Bmatrix} \mu_{NL} \\ \mu_{NM} \\ \mu_{NS} \\ \mu_{ZE} \\ \mu_{PS} \\ \mu_{PM} \end{Bmatrix} = \begin{Bmatrix} a_1 & a_1 & a_2 \\ a_1 & a_2 & a_3 \\ a_2 & a_3 & a_4 \\ a_3 & a_4 & a_5 \\ a_4 & a_5 & a_6 \\ a_5 & a_6 & a_7 \\ a_6 & a_7 & a_7 \end{Bmatrix} \quad (2)$$

where, $\mu_A$ is a set of the fuzzy membership functions for each fuzzy input or output variable, $a_i$ and $a_k$ are the boundaries of the fuzzy value, and $a_j$ is the full membership point of the fuzzy value within a defined domain.

Equation 2 uses a set of seven domain values to define seven fuzzy values in the real-valued operating range. The tuning of fuzzy steering controller was to determine the domain values for each of the fuzzy values. The following vector presents the domains of fuzzy membership functions for a particular variable.

$$A = \{a_1\ a_2\ a_3\ a_4\ a_5\ a_6\ a_7\} \quad (3)$$

RESULTS AND DISCUSSION

Simulation Evaluation on Hardware-in-the-loop Steering Simulator

The fuzzy steering controller was programmed in C++, integrated into a digital agricultural vehicle steering model, and tested on a hardware-in-the-loop (HIL) E/H steering simulator (Zhang et al. 2000). The purpose of the HIL simulation study was to evaluate the stability and accuracy of the fuzzy steering controller. The simulation model was developed based on the assumptions of (1) incompressible fluid in the hydraulic steering system, (2) no internal or external leakage, (3) constant steering loads, and (4) zero system deadband. The dynamic model of the E/H steering system was programmed using SIMULINK. The mathematical model was used to initially derive the fuzzy logic rulebase. Then the field tests were conducted on the HIL simulator platform to validate the rulebase and the control algorithm. Since the actuating system on the HIL simulator was reproduced from an agricultural vehicle, the control algorithm and the steering control rulebase were developed for the actuating system of the HIL simulator.

Fuzzy membership functions used in this fuzzy controller were tuned based on the physical constraints of the HIL simulator. Limited by the size of the hydraulic power unit, the steering rate was constrained within a range of [−0.5, 0.5] m/s. Constrained by the length of the actuating cylinder, the steering error was limited in [−0.2, 0.2] m range. Similarly, the steering control signal range was defined as [−4.0, 5.0] V to represent the fully open signal range for the E/H control valve on the HIL simulator.

The tuning of the fuzzy steering controller was to define the domain of seven fuzzy values for each of input and output variables. In this study, the tuning started with a reasonable guess of initial domains for all seven fuzzy values using a piecewise liberalization approach on both input and output variables. For a triangular fuzzy membership function, the domain of each fuzzy value consists of two boundaries and one full membership point as defined in equation (2). Normally, a very small ZERO fuzzy value was defined for a smooth transition between positive and negative fuzzy values. The other fuzzy values were tuned to meet the requirements of sensitivity to a small signal and quick response to a large signal. The tuning process involved the iteration of the simulations and tests to determine the optimal fuzzy domains for all the fuzzy values. The following vectors summarize the tuned boundary points for fuzzy membership functions of the steering rate, steering error, and steering control signal for the HIL simulator.

$$A_{RATE}=\{-0.50\ -0.25\ -0.10\ 0.0\ 0.10\ 0.25\ 0.50\}\ m/s \quad (4)$$

$$A_{ERROR}=\{-0.200\ -0.019\ -0.010\ 0.0\ 0.010\ 0.019\ 0.200\}\ m \quad (5)$$

$$A_{OUTPUT}=\{-4.0\ -2.5\ -1.0\ 0.0\ 1.0\ 3.0\ 5.0\}\ V \quad (6)$$

Note that these values are different than the values shown in FIGS. 5–7. Those values represent the system as tailored for the actual Case-IH tractor on which it was ultimately implemented.

Figure 9:
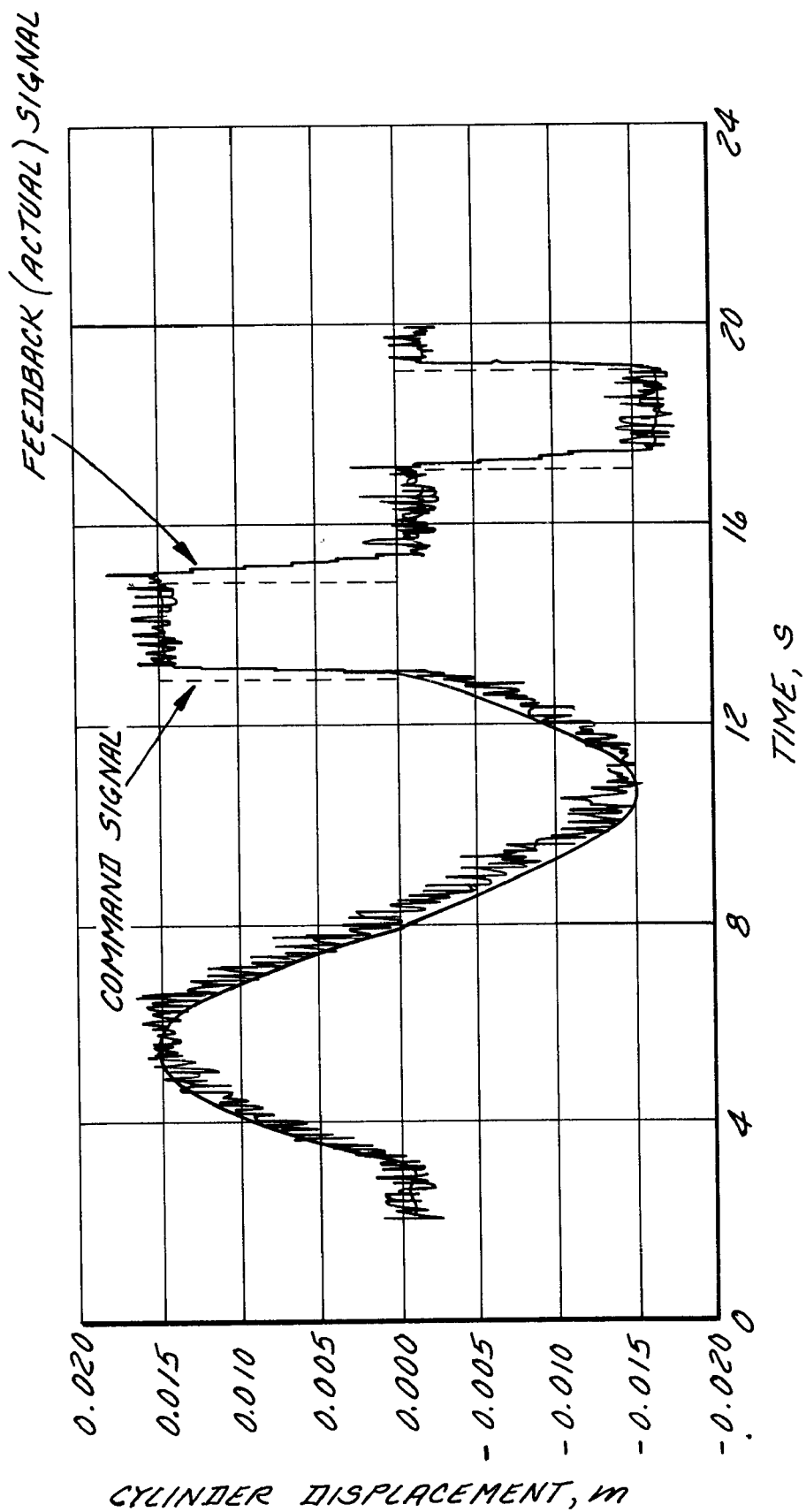
FIG. 9 illustrates the steering control test results using the fuzzy steering controller on a hardware-in-the-loop E/H steering simulator; the test was based on a pre-defined test procedure consisting of a commanding steering angle in the form of a sine wave followed by a command steering angle in the form of a step output.

The performance of the fuzzy steering controller was evaluated using two steering rate command signals: (1) a complete cycle of sine wave of 0.1 Hz in frequency and 0.015 m in amplitude and (2) a complete cycle of step input 0.015 m in amplitude (FIG. 9). The response of the controller provided evidence that the tuned fuzzy membership domains given by equations (4) to (6) provided prompt and accurate steering rate control on this HIL simulator. The maximum error in tracking the sine wave steering rate commands was 0.007 m, and the root mean squared error (RMS) for one complete sine wave cycle was 0.003 m. Under a step steering rate command, the maximum overshoot was 20% with a rise time of 0.5 s. The maximum tracking error was 0.018 m, and the corresponding RMS error for the complete square step commanding cycle was 0.005 m. These relations are illustrated in FIG. 9, which plots the commanded rate (in m/s) versus the actual rate (in m/s). Clearly, the simulated performance of the controller was superior.

Field Tests on a Tractor Platform

After being successfully tuned and tested on the HIL E/H steering simulator, the fuzzy steering controller developed for the HIL E/H simulator was implemented on a Case-IH MX 240 agricultural tractor. The algorithm of the fuzzy controller was unmodified for implementation on the tractor. The only modification to the controller was the retuning of the fuzzy value domains according to the physical constraints of the E/H steering system on the tractor. For the Case-IH MX 240 tractor, the steering rate range was defined between [−20, 20] degrees per second and the steering error range was defined between [−5, 5] degrees due to the capacity of the hydraulic system. The control signal range was defined between [−3.0, 4.0] V to represent the fully open range of the E/H steering control valve.

The fuzzy domain tuning process on the tractor platform was similar to the process done on the simulator. The following vectors are the tuned boundaries for seven fuzzy values of the steering rate, steering error, and steering control signal.

$$A_{RATE}=\{-20\ -10\ -5\ 0\ 5\ 10\ 20\}°/s \quad (7)$$

$$A_{ERROR}=\{-5\ -4\ -1\ 0\ 1\ 4\ 5\}° \quad (8)$$

$$A_{OUTPUT}=\{-3.0\ -2.0\ -0.5\ 0.0\ 0.5\ 2.0\ 4.0\}\ V \quad (9)$$

Note that these values are the ones shown in FIGS. 5–7 as the preferred embodiment. While they are the values that worked in the system described herein, they are not fixed and are largely a function of the specific geometry and electronic characteristics of the mechanical and electrical elements used in the preferred embodiment. It should be understood that a system using a different vehicle with different steering geometries, different actuators, and different valves will most likely have quite different values for each of the fuzzy logic functions.

A series of field tests were performed using the test procedure similar to that used in on-simulator tests with the retuned fuzzy value domains. The test procedure consisted of a complete cycle of sine wave steering rate command of 0.1 Hz in frequency and 15° in amplitude and a complete cycle of step input steering rate command of 5° in amplitude.

Figure 10:
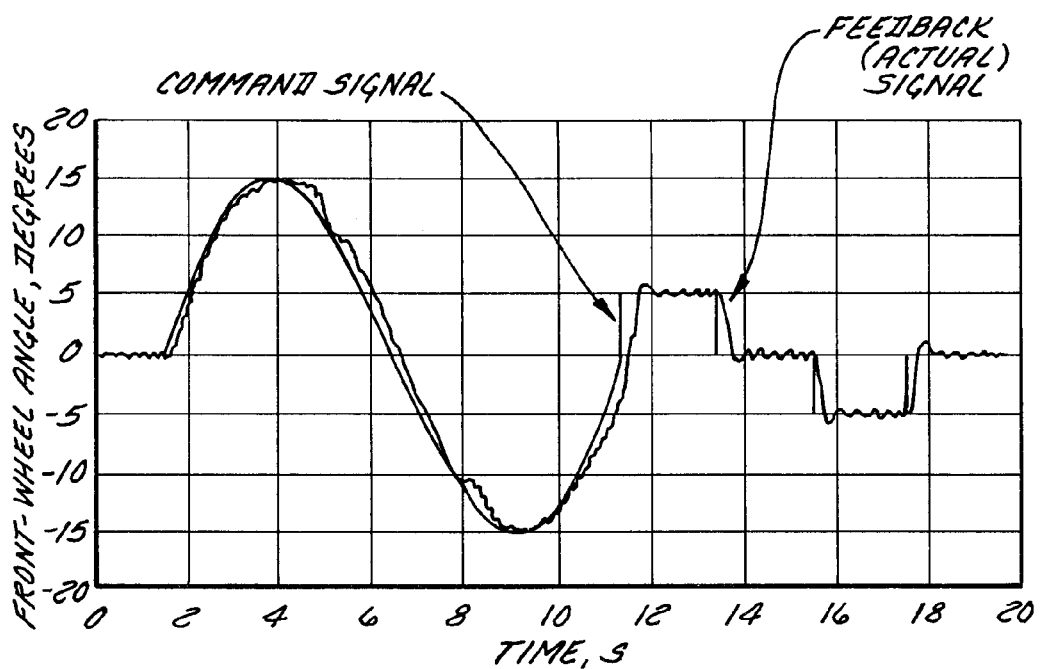
FIG. 10 illustrates the steering control test results using the fuzzy controller on an actual tractor operated in the field at a forward vehicle speed of 0.4 meters per second.
Figure 11:
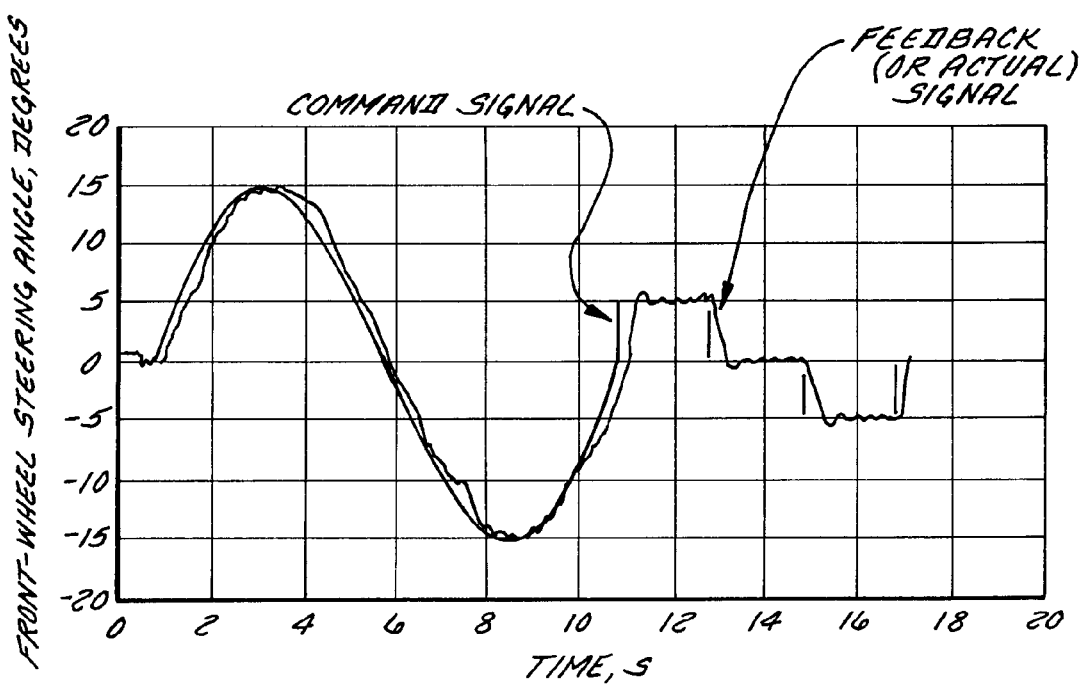
FIG. 11 illustrates the steering control test results using the fuzzy controller on an actual tractor operated in the field at a forward vehicle speed of 2.2 meters per second.

FIG. 10 is the result obtained from the field test at a speed of 0.4 m/s. The results verified that the fuzzy steering controller provided a prompt and accurate steering rate control on the tractor. The maximum error in tracking the sine wave steering rate commands was 1.8°, and the root mean squared error (RMS) for one complete sine wave cycle was 0.84°. Under a step steering rate command, the maximum overshoot was also 20% with a rise time of 0.5 s. The maximum tracking error was 6.1° due to the overshoot, and the corresponding RMS error for the complete square step commanding cycle was 0.5°. A low-pass digital filter was used in the controller and reduced the noise in the feedback signal to improve the tracking performance. Similar results were obtained from different traveling speeds ranging from 0.3 to 7.0 meters per second. FIG. 11 shows the result obtained from the field test at a speed of 2.2 meters per second, which was very similar to the results obtained from the test at 0.4 meters per second.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

For example, the various circuits need not be embodied as custom programs on IBM-compatible computers. Indeed, any practical application will probably replace the personal computers with one or more dedicated microcontrollers or microprocessors. The system need not respond to a steering rate signal but could respond to a steering angle signal from which a filter derives a desired steering rate. Given a current steering angle and a desired steering angle and given an interval over which the system wishes to steer to the desired steering angle, the desired steering rate is easy to calculate.

The system need not use a linear actuator, such as the cylinder described herein, but could use a rotary actuator. The cylinder position sensor provides a signal indicative of the steered position of the front wheels by relying upon the fact that the steering geometry of the steering linkages is fixed. A different sensor could be used at any other point in the steering linkage to provide a signal indicative of the degree of steering, such as a potentiometer fixed to measure the angle between two steering linkages, or a rotary sensor that senses the angle of the wheels with respect to the vehicle itself. All of these and numerous other arrangements that can only be conjectured would provide a signal indicative of the steering angle of the vehicle's wheels. The system need not use a trajectory planner but could use a steering wheel or other device to generate a signal indicative of a desired direction of travel.

What is claimed is:

1. A steering controller for a wheeled work vehicle having a hydraulic actuator coupled to steerable wheels on the vehicle and driven by a proportional control electrohydraulic valve, a sensor that generates a signal indicative of the degree of turning of the wheels and the actual position of the wheels, the controller comprising:

a first fuzzifying circuit configured to convert a single real-valued turning rate signal into a first set of two values indicative of membership in two fuzzy sets;

a second fuzzifying circuit configured to convert a single real-valued turning position error signal into a second set of two values indicative of membership in two fuzzy sets;

a fuzzy rule base including a plurality of rules to convert the first and second sets of values into a third set of values indicating membership in two or more fuzzy steering command sets;

a fuzzy inference engine configured to apply the plurality of rules to the first and second sets and derive the third set of values; and a defuzzifying circuit configured to combine the third set of values into a single real-valued steering command indicative of the degree of opening of the proportional control electrohydraulic valve.

2. The steering controller of claim 1, wherein the first set represents the degree of membership in two of at least five fuzzy domains, including one domain representative of a steering rate of zero.

3. The steering controller of claim 2, wherein the first set represents the degree of membership in two of at least seven fuzzy domains.

4. The steering controller of claim 2, wherein the second set represents the degree of membership in two of at least five fuzzy domains, including at least one domain representative of a steering error of zero degrees.

5. The steering controller of claim 4, wherein the second set represents the degree of membership in two of at least seven fuzzy domains.

6. The steering controller of claim 4, wherein the third set represents the degree of membership in two of at least five fuzzy domains, including at least one domain representative of a steering command indicative of zero flow through the valve.

7. The steering controller of claim 6, wherein the third set represents the degree of membership in two of at least seven fuzzy domains.

8. A wheeled work vehicle comprising:

a chassis;

a plurality of steerable wheels pivotally mounted on the chassis;

at least one hydraulic actuator coupled to the plurality of steerable wheels and to the chassis to steer the wheels left and right with respect to the chassis;

an electrohydraulic proportional control valve fluidly coupled to the at least one actuator to regulate the flow of hydraulic fluid to the actuator in proportion to a valve signal;

a driver circuit configured to convert a steering command signal to the valve signal;

a microprocessor coupled to the driver circuit and configured to calculate the steering command signal based at least upon a signal indicative of an error in wheel steering position and a signal indicative of a rate of change of wheel steering position, wherein the microprocessor is further configured to fuzzify the signal indicative of a rate of change of wheel turning, by converting it into a first set of two values indicative of membership in two fuzzy sets, fuzzify the signal indicative of an error in wheel steering position by converting it into a second set of two values indicative of membership in two fuzzy sets, convert the first and second sets into a third set of values indicating membership in two or more fuzzy steering command sets by a fuzzy logic inference engine using a fuzzy logic rule base, and defuzzify the third set of values into the steering command indicative of the degree of opening of the valve.

9. The vehicle of claim 8, further comprising:

a position sensor coupled to move responsively with both the wheels and the actuator and to provide the signal indicative of such motion.

10. The vehicle of claim 9, wherein the signal indicative of such motion is directly representative of the actuator position.

11. The vehicle of claim 9, wherein the signal indicative of an error in wheel steering position is derived from the signal indicative of such motion.

12. The vehicle of claim 11 further comprising a trajectory-planning controller configured to compute a vehicular course of travel through the field and to derive the signal indicative of an error in wheel steering position and the signal indicative of wheel steering rate.

13. A method for controlling the steering of a vehicle having steerable wheels steered by a hydraulic actuator, wherein the actuator is controlled by a proportional control valve regulated by a signal indicative of a degree of valve opening, the vehicle further having a microprocessor-based controller configured to generate the signal thereby controlling the steering position of the wheels, the method comprising the following microprocessor steps:

receiving a first real-valued signal indicative of an error in wheel steering position;

converting the first real-valued signal into a first plurality of values indicative of membership in a corresponding first plurality of fuzzy steering error domains;

receiving a second real-valued signal indicative of a rate of wheel steering;

converting the second real-valued signal into a second plurality of values indicative of membership in a corresponding second plurality of fuzzy steering rate domains;

combining the first and second plurality of values to generate a third plurality of values indicative of membership in at least two of five steering command domains using a plurality of fuzzy logic rules in a fuzzy logic rule base that are selected at least to reduce the steering error signal toward zero;

converting the third plurality of values into a single real-valued steering command signal indicative of the degree of opening of the valve;

converting the single real-valued steering command signal into a valve signal in a driver circuit;

applying the valve signal to the valve;

responsively moving the actuator to a position in which the steering error is reduced.

14. The method of claim 13, wherein the step of converting the first real valued signal includes the steps of:

comparing the first real-valued signal with at least five fuzzy steering error domains;

determining the degree of membership in each of the at least five fuzzy steering error domains; and producing at least two values indicative of the degree of membership in at least two of the five fuzzy steering error domains.

15. The method of claim 14, wherein the step of converting the second real valued signal includes the steps of:

comparing the second real-valued signal with at least five fuzzy steering rate domains;

determining the degree of membership of each of the at least five fuzzy steering rate domains; and producing at least two values indicative of the degree of membership in at least two of the five fuzzy steering rate domains.

16. The method of claim 15, wherein the rulebase associates the at least five fuzzy steering error domains and the at least five fuzzy steering rate domains with at least five fuzzy logic steering command domains, and further wherein the step of combining the first and second pluralities of values includes the steps of:

accessing the rule base with the first and second pluralities of values;

determining the degree of membership of each of the at least five fuzzy steering commands; and producing at least two steering command values indicative of the degree of membership in at least two of the five fuzzy logic steering command domains.

17. The method of claim 16, wherein one of the fuzzy logic steering rate domains is centered on a steering rate of zero, and wherein one of the fuzzy logic steering domains is centered on an error of zero, and wherein one of the fuzzy logic steering command domains is centered on a command signal providing an effective flow rate of zero through the valve.

18. The method of claim 17, wherein there are at least seven fuzzy logic steering rate domains and further wherein three of those domains are symmetrically balanced with three other steering rate domains about a steering rate of zero.

19. The method of claim 18, wherein there are at least seven fuzzy logic steering error domains and further wherein three of those domains are symmetrically balanced with three other steering error domains about a steering error of zero.

20. The method of claim 19, wherein there are at least seven fuzzy logic steering command domains and further wherein three of those domains are symmetrically balanced with three other steering command domains about a steering command providing an effective flow rate of zero through the valve.

* * * * *